United States Patent [19]

Voland

[11] Patent Number: 4,503,914

[45] Date of Patent: Mar. 12, 1985

[54] HORSESHOE APPARATUS FOR EQUIDAE

[76] Inventor: Frederic Voland, 16 Av Henri Barbusse, 13760 St. Cannat, France

[21] Appl. No.: 444,313

[22] Filed: Nov. 24, 1982

[30] Foreign Application Priority Data

Nov. 27, 1981 [FR] France .................. 81 22460

[51] Int. Cl.³ .................... A01L 3/00; A01L 5/00
[52] U.S. Cl. .......................... 168/18; 54/82
[58] Field of Search ............ 168/1, 2, 12, 13, 14, 168/17, 18, 26, 27, 28; 54/82

[56] References Cited

U.S. PATENT DOCUMENTS

| 914,003 | 3/1909 | Woolverton | 168/27 |
| 2,446,371 | 8/1948 | Jones | 168/18 |
| 3,236,310 | 2/1966 | Quick | 168/18 |
| 3,630,289 | 12/1971 | Norberg | 168/28 |
| 4,189,004 | 2/1980 | Glass | 168/18 X |
| 4,212,356 | 7/1980 | Battle | 168/18 |

FOREIGN PATENT DOCUMENTS

| 2208962 | 2/1972 | Fed. Rep. of Germany . | |
| 683409 | 6/1930 | France | 168/18 |
| 2344223 | 3/1977 | France . | |
| 2447146 | 9/1980 | France | 168/1 |

Primary Examiner—Robert P. Swiatek
Attorney, Agent, or Firm—Sandler & Greenblum

[57] ABSTRACT

A horseshoe apparatus protection assembly for Equidae comprising a flexible and elastic housing material with an outer cover comprising rigid material covering the protection assembly. The horseshoe is intended for the protection of the feet of horses, ponies, donkeys, mules, and other animals in the utilitarian and sportive domains. The inner housing may be stamped or cast using elastomeric materials to conform to the shape of the foot. The rigid material of the outer cover comprises synthetic resins including adiprene. The outer cover may also be adapted to be elastic at its upper regions to permit ease of fitting and removal of the horseshoe apparatus from the foot of the animal. The base or sole of the outer cover may be adapted to accommodate additional elements comprising calks, non-skid plates, horseshoes and like devices traditionally used in conjunction with foot coverings for animals. The inner housing may be adapted to contain a treatment product by means of a groove to hold the treatment product or by impregnating the inner layer with the treatment product.

31 Claims, 6 Drawing Figures

FIG 1
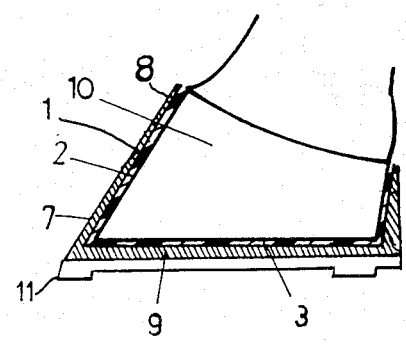
FIG 2              FIG 3
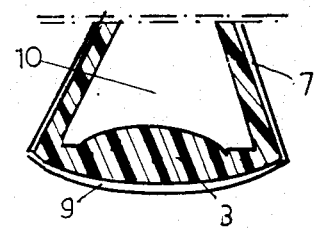   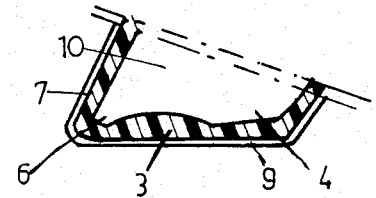
FIG 4              FIG 5
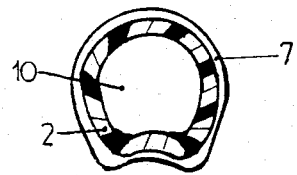   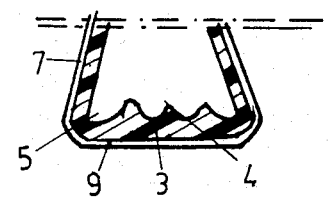
FIG 6
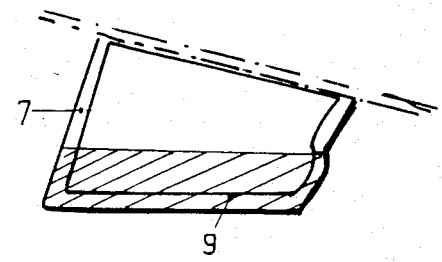

HORSESHOE APPARATUS FOR EQUIDAE

BACKGROUND OF THE INVENTION

1. Field of the Invention

The object of the invention relates to a shoe apparatus for Equidae.

It is intended for the protection of the feet of horses, ponies, donkeys, mules and like animals in the utilitarian and sportive domains.

2. Description of the Prior Art

Until today, the hooves were equipped, either by conventional horseshoes and offshoots or derivatives or by horse sandals of synthetic resin and the like.

These elements of foot protection presented multiple inconveniences. For example, they were not sufficiently shock absorbant. This is in part due to the fact that the positioning of the horseshoe only allowed the crust, and not the carrying assembly which comprises the sole, the frog and the lower crust edge, to participate in the shock absorption. In addition, glueing or nailing horseshoes on the hoof prevented the hoof from dilating. Finally, the weight of the horseshoes is a factor which limits performance. Moreover, these protections in general are ineffectual against preventing penetrations which wound the sole, as well as against foreign bodies from becoming wedged between the horseshoe and the sole which bruise the sole causing contusions.

In addition, fitted and laced horse sandals also present problems. The disadvantages include a lack of effective retention on the hoof because of their flexibility, as well as a total lack of shock absorbancy and effective protection. Thus, their use leads to the possibility of injury. It also should not go without mentioning that the materials used wear out rapidly.

SUMMARY OF THE INVENTION

The apparatus according to the invention removes these inconveniences associated with the use of horseshoes and horse sandals to ensure an optimal shock absorbancy, and an effective and nontraumatic elastic retention, while also giving the foot a support on the entirety of the lower carrying surfaces comprising the sole, the lower edge of the crust and the frog. In addition, the foot can dilate freely while being protected on all sides.

The shoe apparatus is comprised of the combination and the superposition of a flexible and elastic inner housing material with an outer cover of rigid material covering the protection assembly.

BRIEF DESCRIPTION OF THE DRAWINGS

In the annexed drawings, given by way of non-limiting example, of one of the embodiments of the object of the invention:

FIG. 1 represents a longitudinal cross-sectional view of the protective cover.

FIGS. 1 through 5 show the longitudinal and transversal and plane sections of covers on a different scale.

FIG. 6 represents the particularities of the structure of the outer housing.

DETAILED DESCRIPTION OF THE INVENTION

Horseshoe generally indicated by element 1 receives on all of its sides a flexible and elastic housing 2. This elastic layer covers the outer side of the solid horseshoe, and protects the foot. Thus, the inner cover of the horseshoe protects the bones, cartilage, pads of the soles, soft skin, layers of skin, blood vessels, lymph glands and the frog.

The function of inner sole 3 adjacent the carrying surfaces is comparable to the shock absorption obtained with the aid of a hydraulic cushion. The effectiveness of the inner sole comes from the fact that its support of the frog 4 and the sole 5 of the foot is as complete as possible. This support is identical in its entirety or conforms to the elements in which the inner sole is contact. Thus the elastic and flexible layer or housing 2, molds to the hoof and exactly fits the shape of the toe 6, the sole 5, and the frog 4 of the foot. The flexible layer 2 can be comprised of rubber, elastomer and of any other synthetic resin presenting or exhibiting the same or similar qualities of elasticity and flexibility.

The outside wall 7, however, molds itself exactly to the flexible and elastic housing 2. It is slightly elastic at its upper section 8 but only to permit the shoe to slip onto the hoof 10. However, progressively it reaches a maximal rigidity at the level of outer sole 9 to ensure an effective protection and to resist wear. Alternatively, the outer layer 7 can be made of a homogeneous "adriprene" or synthetic resin layer wherein the thickness can be varied to obtain more elasticity. Thus, it is equally possible to make a flexible inner face and a hard outer face. Also, openings can be provided for the passage of retention straps and the outer face can receive reinforcement fittings for calks or other accessories.

In any case, the retention and protection device can be attached with fittings of similar material to rest stationary of can be removed to free the foot of the horse.

The inner layer 2 can be obtained by stamping, or casting an imprint of the foot itself. Any other covering process according to the nature of the material can also be used. The outer "adiprene" or synthetic resin layer 7 can also be cast with the mold or imprint calculated or based on the form of first layer.

In addition to the foregoing, it is possible to use the inner housing to care for an ailment of the foot by providing, for example, a groove intended to hold a treatment product. Alternatively, the housing can be impregnated with an active agent.

According to the application to which the shoe is put to use, one can also provide perforations to ensure the passage of air either through the inner or elastic housing 2 or through the rigid cover or outside wall 7.

In view of the foregoing, the shapes, dimensions and positions of the various elements can vary within the limits of equivalents, as well as the materials used for their manufacture, without changing the general conception of the invention which has just been described.

I claim:

1. Horseshoe apparatus for Equidae intended for the protection of the feet of horses, ponies, donkeys, mules and similar animals comprising the combination of a flexible and elastic inner housing material within an outer cover of rigid material covering the whole surface of the hoof wherein said flexible and elastic inner housing material comprises natural and synthetic rubber and synthetic resins and is stamped or cast to exactly fit the shape of the toe, nob, crust, and frog of said feet.

2. Apparatus according to claim 1 wherein said outer cover has a sole at its base and sides having upper and lower portions comprised of rigid synthetic resin material comprising "adiprene", wherein said upper portion is slightly elastic and becomes progressively more rigid towards said sole, said sole being hard and resistant.

3. Apparatus according to claim 2 wherein said sole of said outer cover further comprises complementary protection elements comprising calks, non-skids, and horseshoes and wherein said inner housing material comprises active agents for treatments and is adapted to have aeration perforations.

4. Apparatus according to claim 1 wherein the horseshoe apparatus comprises attachment elements thereby rendering the stationary shoe removable from the feet of Equidae.

5. Apparatus to be worn on the foot of an animal comprising a housing having inner and outer layers wherein said inner layer completely covers the foot of the animal, said inner layer comprising a portion made of elastic material positioned adjacent the foot of the animal and being formed by casting or stamping said material to conform to the shape of said foot having a carrying surface comprising a toe and a sole.

6. Apparatus according to claim 5 wherein said outer layer is adapted to have reinforcement fittings.

7. Apparatus according to claim 6 further comprising accessories provided in said fittings.

8. Apparatus according to claim 7 wherein said accessories comprise calks.

9. Apparatus according to claim 6 wherein said reinforcement fittings comprise openings.

10. Apparatus according to claim 9 further comprising retention straps in association with said openings.

11. Apparatus according to claim 5 wherein said inner layer is adapted to contain a treatment product.

12. Apparatus according to claim 11 wherein said inner layer is provided with a groove to hold said treatment product.

13. Apparatus according to claim 11 wherein said inner layer is impregnated with said treatment product.

14. Apparatus according to claim 5 wherein said outer layer is provided with perforations.

15. Apparatus according to 5 wherein said inner layer is provided with perforations.

16. Apparatus according to claim 5 wherein both said inner and outer layers are provided with perforations.

17. Apparatus according to claim 5 wherein said inner layer comprises a material selected from the group comprising rubber, elastomer and synthetic resin materials.

18. Apparatus according to claim 5 wherein said foot is a hoof and said carrying surface further comprises a frog.

19. Apparatus according to claim 5 wherein said outer layer comprises a rigid outer sole at its base to resist wear.

20. Apparatus according to claim 19 wherein said outer layer is progressively rigid towards said outer sole.

21. Apparatus according to claim 20 wherein said outer layer comprises said elastic portion.

22. Apparatus according to claim 21 wherein said elastic portion is provided at the upper portion of said outer layer thereby permitting said housing to be slipped onto and removed from said foot.

23. Apparatus according to claim 19 wherein said outer layer comprises a synthetic resin.

24. Apparatus according to claim 23 wherein said synthetic resin is adiprene.

25. Apparatus according to claim 19 wherein said outer layer is formed by casting said material based on the imprint of the form of said inner layer.

26. Apparatus according to claim 5 wherein said inner layer conforms to the shape of said foot whereby the entire foot is completely supported.

27. Apparatus to be worn on the foot of an animal comprising a housing having inner and outer layers wherein said inner layer is elastic material positioned adjacent the foot of the animal and being formed by casting or stamping said material to conform to the shape of said foot and wherein said outer layer comprises an elastic upper portion and is progressively rigid toward a rigid outer sole base.

28. Apparatus according to claim 27 wherein said inner portion is adapted to contain a treatment product.

29. Apparatus according to claim 27 wherein at least one of said layers is provided with perforations.

30. Apparatus according to claim 27 wherein said outer layer further comprises fittings.

31. Apparatus according to claim 30 wherein said housing further comprises retention straps.

* * * * *

UNITED STATES PATENT AND TRADEMARK OFFICE
CERTIFICATE OF CORRECTION

PATENT NO. : 4,503,914

DATED : March 12, 1985

INVENTOR(S) : Frederic VOLAND

It is certified that error appears in the above-identified patent and that said Letters Patent is hereby corrected as shown below:

Column 2, line 33, change "of" (1st occurrence) to --or--.

Signed and Sealed this

Thirteenth Day of August 1985

[SEAL]

Attest:

DONALD J. QUIGG

Attesting Officer     Acting Commissioner of Patents and Trademarks